(12) United States Patent
Lang et al.

(10) Patent No.: US 7,331,604 B2
(45) Date of Patent: Feb. 19, 2008

(54) PROTECTIVE SLEEVE

(75) Inventors: Gregory J Lang, South Ogden, UT (US); Kenneth J. Clark, Morgan, UT (US); William D. Staheli, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 215 days.

(21) Appl. No.: 11/122,407

(22) Filed: May 5, 2005

(65) Prior Publication Data

US 2006/0249940 A1    Nov. 9, 2006

(51) Int. Cl.
*B60R 21/26* (2006.01)
(52) U.S. Cl. ...................................... 280/736
(58) Field of Classification Search ............... 280/736, 280/740, 741, 742; 102/530, 531; 29/450, 29/453; 228/160
See application file for complete search history.

(56) References Cited

U.S. PATENT DOCUMENTS

| | | | | |
|---|---|---|---|---|
| 2,839,441 A | * | 6/1958 | Kent | 156/257 |
| 4,998,751 A | * | 3/1991 | Paxton et al. | 280/741 |
| 5,445,408 A | * | 8/1995 | Mossi | 280/728.2 |
| 5,609,362 A | * | 3/1997 | Sparks et al. | 280/741 |
| 5,671,945 A | * | 9/1997 | Rhule et al. | 280/740 |
| 6,189,926 B1 | * | 2/2001 | Smith | 280/737 |
| 2005/0127649 A1 | * | 6/2005 | Smith | 280/741 |
| 2005/0189753 A1 | * | 9/2005 | Kato et al. | 280/741 |
| 2005/0194771 A1 | * | 9/2005 | Clark et al. | 280/736 |

* cited by examiner

*Primary Examiner*—Paul N. Dickson
*Assistant Examiner*—Joseph Rocca
(74) *Attorney, Agent, or Firm*—Sally J Brown; Stoel Rives LLP

(57) ABSTRACT

Disclosed are methods for covering a weld line and structures used to cover a weld line. Embodiments of the method comprise covering a weld line, such as the weld line between components of an airbag inflator structure, with a protective sleeve. This allows jagged edges and whiskers created during the welding process to be covered. The protective sleeve may comprise an annular structure adapted to be fitted over the weld line.

30 Claims, 3 Drawing Sheets

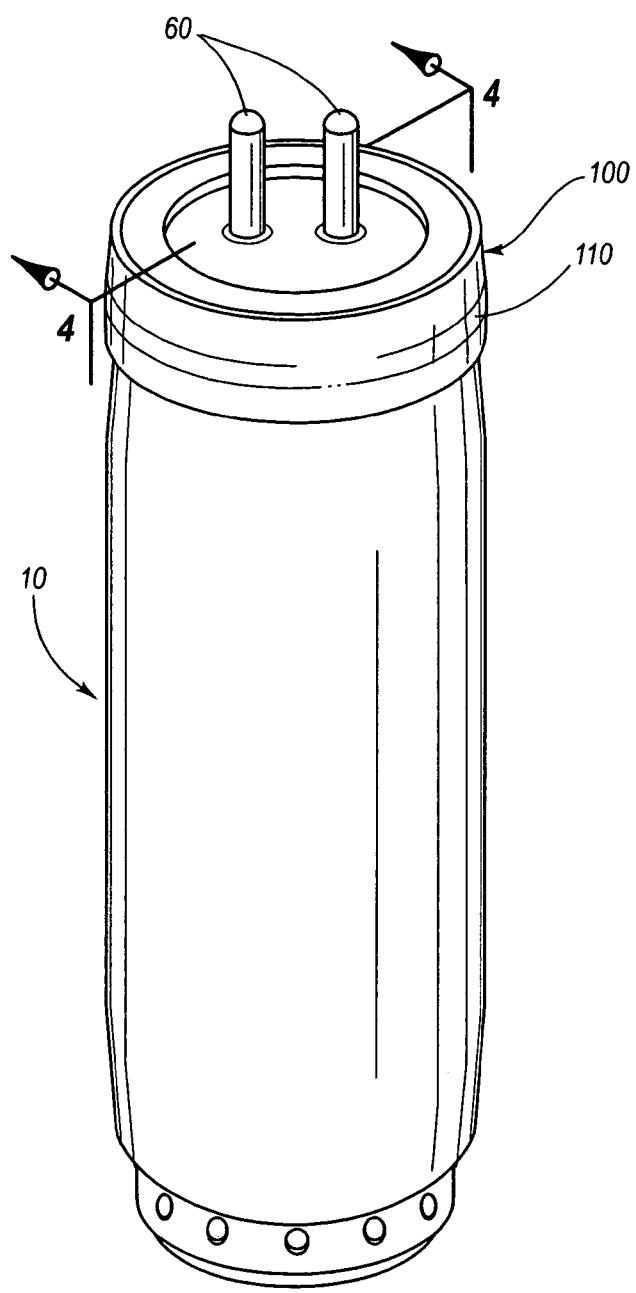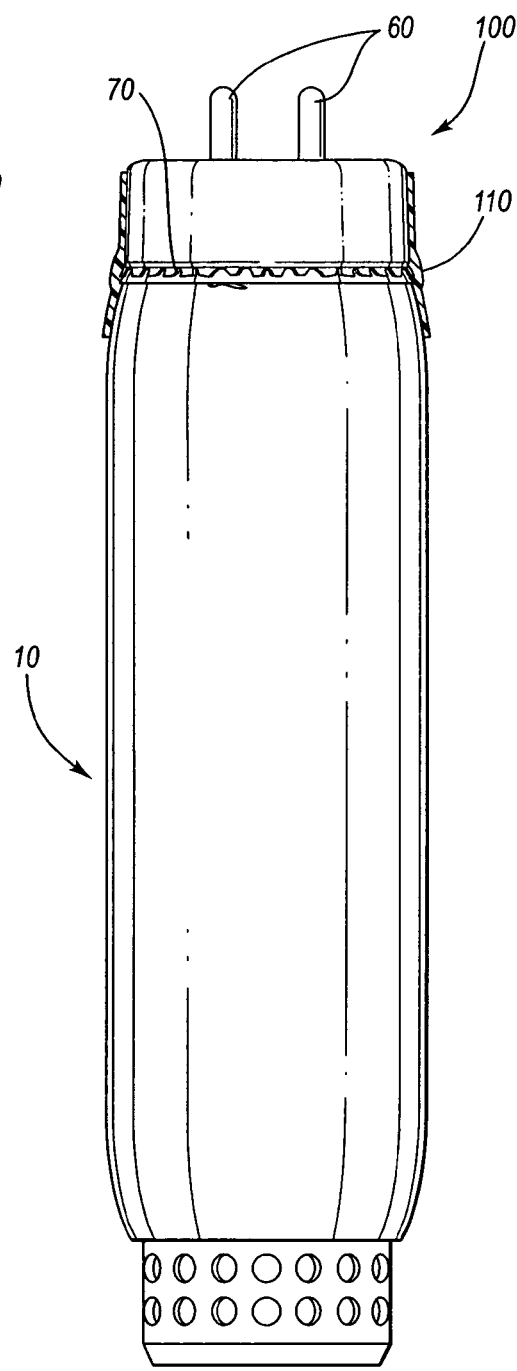
Fig. 3
Fig. 4

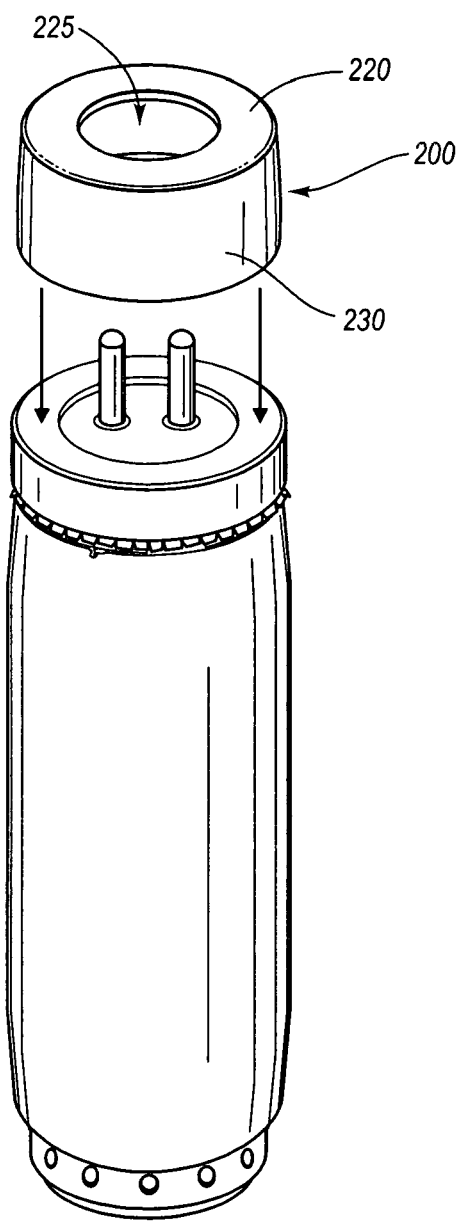
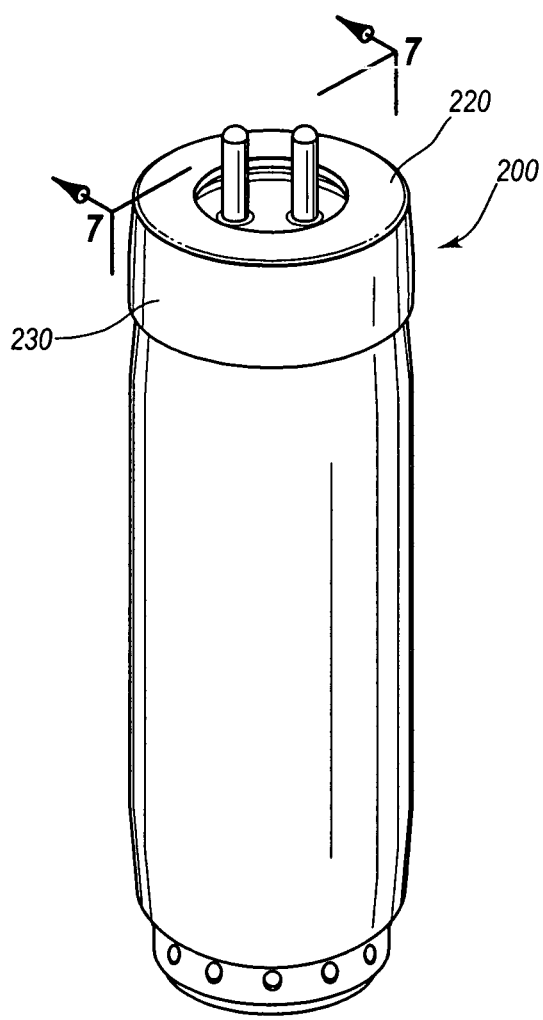
Fig. 5
Fig. 6
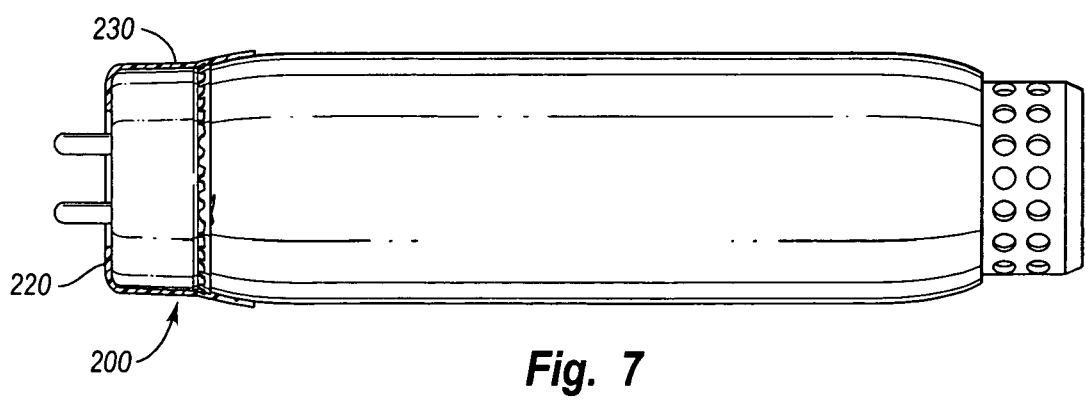
Fig. 7

PROTECTIVE SLEEVE

TECHNICAL FIELD

The present invention relates generally to the field of automotive protective systems. More specifically, the present invention relates to protective sleeves for use in connection with inflatable airbag systems.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 3 is a perspective view of the protective sleeve embodiment shown in FIG. 2 positioned over the weld line on the inflator.

FIG. 4 is a cross-sectional view of the protective sleeve taken along line 4-4 in FIG. 3.

FIG. 5 is a perspective view of another embodiment of a protective sleeve being placed over a weld line on the inflator.

FIG. 6 is a perspective view of the protective sleeve embodiment shown in FIG. 5 positioned over the weld line on the inflator.

FIG. 7 is a cross-sectional view of the protective sleeve taken along line 7-7 in FIG. 6.

DETAILED DESCRIPTION OF PREFERRED EMBODIMENTS

Figures 1, 2:
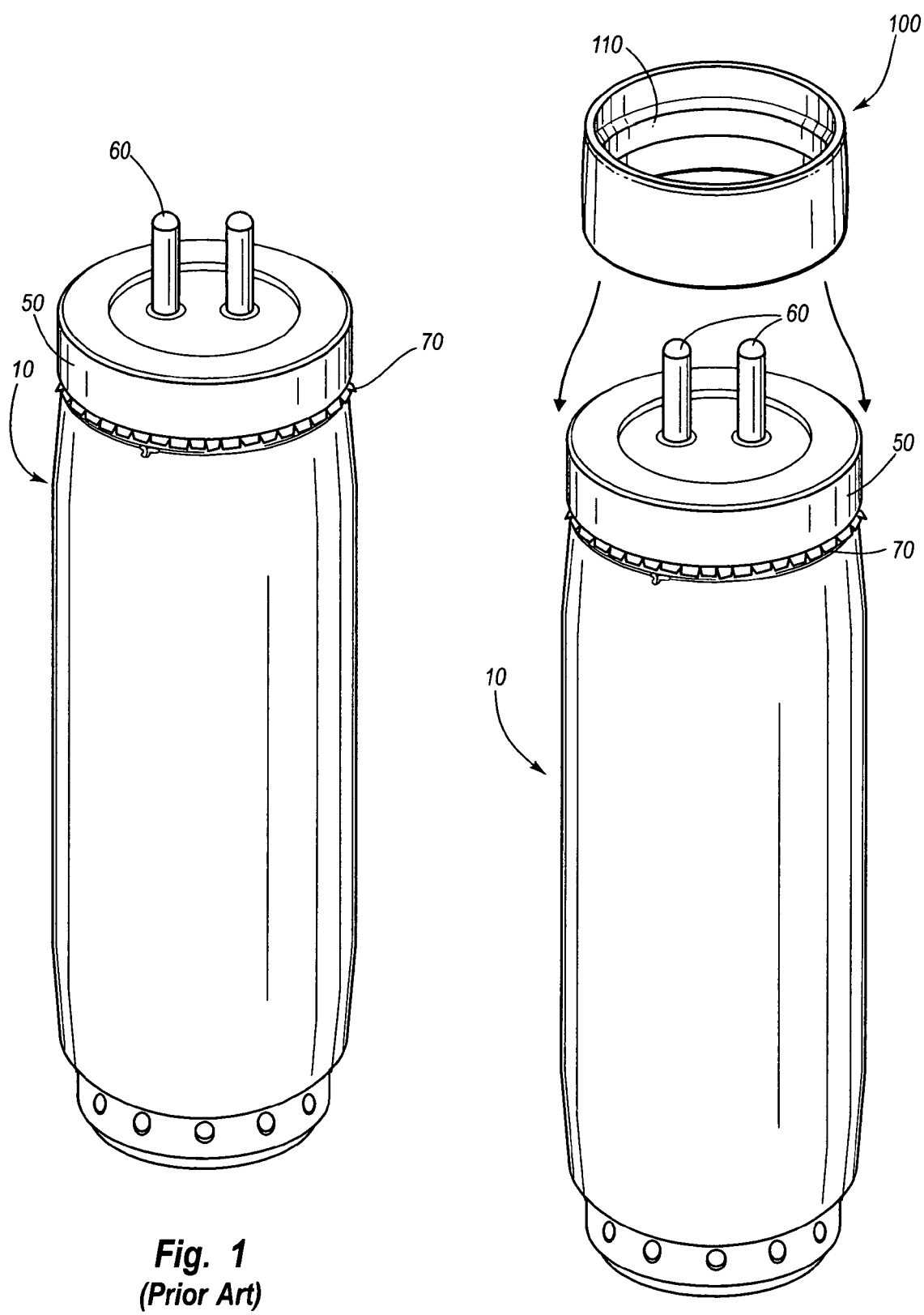
FIG. 1 is a perspective view of an inflator with a weld line.
FIG. 2 is a perspective view of an embodiment of a protective sleeve being placed over a weld line on the inflator.

Described below are embodiments of methods and structures for covering a weld line. Embodiments of the method comprise covering a weld line, such as the weld line between components of an airbag inflator structure, with a protective sleeve, thereby allowing jagged edges and whiskers created during the welding process to be covered. Embodiments of the protective sleeve may comprise an annular structure adapted to be fitted over the weld line. Embodiments of the protective sleeve may also include a circumferential feature that has a smaller inner diameter than the remainder of the protective sleeve. This may be provided for ease of application and, moreover, to provide a stretch fit to keep the sleeve on the weld line.

Referring now to FIG. 1, an airbag inflator is shown at 10. An adapter 50 holding initiator 60 has been welded to the structure at weld line 70. As those having ordinary skill in the art will appreciate, various types of welding, such as inertia welding, often creates weld curls, which can comprise jagged edges and/or "whiskers". An embodiment of a protective sleeve that may be used to cover weld line 70 is shown in FIG. 2 at 100. As can be seen, protective sleeve 100 comprises an annular structure. It is intended that the term "annular" should encompass all structures having a generally ring-shaped construction. Virtually any structure defining two openings should be considered within the scope of the term, including structures which perhaps more accurately might be described as "tubular" or "cylindrical". Of course, the two openings need not be the same size in order for the defining structure to be considered annular. It should also be understood that while protective sleeve 100 is annular in shape, a wide variety of other shapes may be suitable. For example, a bottom may be added to the annular structure described above to form a bowl or pan-like shape. Protective sleeve 100 may be made of a plastic material or any other flexible material such that it can be stretched.

In the embodiment depicted in FIGS. 2-4 of the accompanying drawings, protective sleeve 100 includes a circumferential feature 110 formed therein. Circumferential feature 110 has a smaller inner diameter than the remainder of protective sleeve 100. Circumferential feature 110 is shown as being positioned substantially at the mid-point of protective sleeve 100 such that approximately equal portions of the protective sleeve lie on either side of the circumferential feature. However, variations on the placement of circumferential feature 110 are possible. For example, the circumferential feature may be positioned towards one end of protective sleeve 100 such that a substantially larger portion of the protective sleeve lies on one side of the circumferential feature than the other side. The circumferential feature may also be positioned at the end of the protective sleeve.

Additionally, the circumferential feature may be flat, as shown in FIG. 2, or rounded, or of any other shape as desired. It is contemplated that the circumferential feature could also be much narrower relative to the width of the protective sleeve than circumferential feature 110 is in the accompanying figures. It should also be understood that the circumferential feature may comprise a thicker region on the protective sleeve, as is shown in FIG. 2, or, alternatively, the exterior surface of the protective sleeve may recess or bow inward at the circumferential feature such that the entire protective sleeve is approximately the same thickness. Of course, it should be understood that not all embodiments of the invention will include a circumferential feature at all.

A second embodiment of a protective sleeve is shown in FIGS. 5-7 at 200. In this embodiment, protective sleeve 200 includes a bottom surface 220, which defines an opening 225. Bottom surface 220 extends at an angle relative to side surface 230. Bottom surface 220 may facilitate application of protective sleeve 200 by limiting the distance with which protective sleeve 200 extends over the weld line (or onto the airbag inflator components welded together). Of course, protective sleeve 200 may include a circumferential feature similar to that described in connection with protective sleeve 100.

Because protective sleeve 200 defines two openings, it should be considered within the scope of the term "annular", despite the fact that the two openings differ in size. As previously discussed, some protective sleeve embodiments may have a bottom surface that does not define a second opening, such that a bowl or pan-shaped protective sleeve is provided.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The invention claimed is:

1. A method for covering a weld line, comprising:
   welding together components of an airbag inflator structure; and
   covering the weld line with a protective sleeve such that the protective sleeve is positioned adjacent to and extends over the weld line.

2. The method of claim 1, wherein the components are welded by inertia welding.

3. The method of claim 1, wherein the protective sleeve comprises a flexible material.

4. The method of claim 3, wherein the protective sleeve comprises a plastic material.

5. The method of claim 1, wherein the protective sleeve includes a circumferential feature that has a smaller inner diameter than the remainder of the protective sleeve.

6. The method of claim 5, wherein the circumferential feature has an inner diameter that is smaller than the outer diameter of the area of the airbag inflator structure covered by the protective sleeve such that the step of covering the weld line comprises stretching the protective sleeve over the weld line.

7. The method of claim 5, wherein the circumferential feature is positioned substantially at the mid-point of the protective sleeve such that approximately equal portions of the protective sleeve lie on either side of the circumferential feature.

8. The method of claim 5, wherein the circumferential feature is positioned towards one end of the protective sleeve such that a substantially larger portion of the protective sleeve lies on one side of the circumferential feature than the other side.

9. The method of claim 5, wherein the circumferential feature comprises a thicker region on the protective sleeve.

10. The method of claim 1, wherein one of the components houses an initiator.

11. The method of claim 1, wherein one of the components is used to store inflation gas.

12. The method of claim 1, wherein the protective sleeve is annular in that it is open at both ends.

13. The method of claim 1, wherein the protective sleeve has a bottom surface extending at an angle relative to a side surface defining the remainder of the protective sleeve.

14. A method for covering a weld line, comprising:
   welding together components of an airbag inflator structure; and
   stretching a protective sleeve over the weld line, wherein the protective sleeve comprises a flexible annular structure having a circumferential feature formed therein that has a smaller inner diameter than the remainder of the protective sleeve.

15. The method of claim 14, wherein the components are welded by inertia welding.

16. The method of claim 14, wherein the protective sleeve comprises a plastic material.

17. The method of claim 14, wherein the circumferential feature comprises a thicker region on the protective sleeve.

18. A protective sleeve for use in combination with an airbag inflator structure to cover a weld line in the airbag inflator structure, the protective sleeve comprising:
   a flexible annular structure configured to be fit over the weld line, wherein the flexible annular structure comprises a first opening at a first end and a second opening at a second end; and
   a circumferential feature formed in the flexible annular structure and positioned in between the first and second ends, wherein the circumferential feature has a smaller inner diameter than the remainder of the flexible annular structure.

19. The protective sleeve of claim 18, wherein the circumferential feature is positioned substantially at the mid-point of the protective sleeve such that approximately equal portions of the protective sleeve lie on either side of the circumferential feature.

20. The protective sleeve of claim 18, wherein the circumferential feature is positioned towards one end of the protective sleeve such that a substantially larger portion of the protective sleeve lies on one side of the circumferential feature than the other side.

21. The protective sleeve of claim 18, wherein the circumferential feature comprises a thicker region on the annular structure.

22. The protective sleeve of claim 18, wherein the annular structure comprises a plastic material.

23. The protective sleeve of claim 18, further comprising a bottom surface and a side surface, wherein the bottom surface extends at an angle relative the side surface.

24. The protective sleeve of claim 22, wherein the annular structure is configured to be stretched over the weld line.

25. An airbag inflator structure, comprising:
   an airbag inflator comprising a weld line; and
   a protective sleeve positioned to cover the weld line such that the protective sleeve is positioned adjacent to and extends over the weld line.

26. The airbag inflator structure of claim 25, wherein the protective sleeve comprises an annular structure.

27. The airbag inflator structure of claim 26, wherein the protective sleeve comprises a flexible material.

28. The airbag inflator structure of claim 27, wherein the protective sleeve comprises a plastic material.

29. The airbag inflator structure of claim 25, wherein the protective sleeve comprises a circumferential feature having a smaller inner diameter than the remainder of the protective sleeve.

30. The airbag inflator structure of claim 29, wherein the circumferential feature comprises a thicker region on the protective sleeve.

* * * * *